US007863825B2

(12) United States Patent
Li et al.

(10) Patent No.: US 7,863,825 B2

(45) Date of Patent: Jan. 4, 2011

(54) LED DRIVER CIRCUIT FOR PROVIDING DESIRED LUMINANCE WITH CONSTANT CURRENT

(75) Inventors: Yi-Mei Li, Nantou County (TW); Yung-Hsin Chiang, Taipei County (TW)

(73) Assignee: ADDtek Corp., Songshan District, Taipei (TW)

( * ) Notice: Subject to any disclaimer, the term of this patent is extended or adjusted under 35 U.S.C. 154(b) by 556 days.

(21) Appl. No.: 11/953,844

(22) Filed: Dec. 10, 2007

(65) Prior Publication Data

US 2008/0180044 A1 Jul. 31, 2008

Related U.S. Application Data

(60) Provisional application No. 60/887,154, filed on Jan. 30, 2007.

(51) Int. Cl.
*H05B 37/00* (2006.01)

(52) U.S. Cl. .............................. 315/185 S; 315/200 A; 315/312; 315/209 R; 315/247

(58) Field of Classification Search ......... 362/800–812; 315/185 S, 200 A, 312–326
See application file for complete search history.

(56) References Cited

U.S. PATENT DOCUMENTS

| | | | | |
|---|---|---|---|---|
| 4,438,474 | A * | 3/1984 | Paice | 361/58 |
| 4,728,866 | A * | 3/1988 | Capewell et al. | 315/224 |
| 6,853,561 | B2 * | 2/2005 | Elek et al. | 363/17 |
| 7,025,473 | B2 * | 4/2006 | Dokoupil | 362/640 |
| 7,345,433 | B2 * | 3/2008 | Bacon et al. | 315/291 |
| 7,679,292 | B2 * | 3/2010 | Allen et al. | 315/200 R |
| 2005/0053368 | A1 * | 3/2005 | Pesu et al. | 392/390 |
| 2006/0071806 | A1 * | 4/2006 | Hollnberger et al. | 340/815.45 |
| 2007/0069663 | A1 * | 3/2007 | Burdalski et al. | 315/312 |
| 2007/0217210 | A1 * | 9/2007 | Jeong et al. | 362/428 |
| 2008/0116816 | A1 * | 5/2008 | Neuman et al. | 315/185 S |

* cited by examiner

*Primary Examiner*—Tuyet Thi Vo
(74) *Attorney, Agent, or Firm*—Winston Hsu; Scott Margo

(57) ABSTRACT

An LED driver circuit that sinks pure DC current through LEDs. According to the invention, a constant current sink circuit is coupled to a full bridge rectifier. The full bridge rectifier includes at least a first bridge arm, a second bridge arm, a third bridge arm and a fourth bridge arm. The first bridge arm and the fourth bridge arm are connected in parallel with the third bridge arm and the second bridge arm in opposite directions, respectively. The connection of the first bridge arm and the third bridge arm and the connection of the second bridge arm and the fourth bridge arm are connected in series. Each of the bridge arms may consist of at least one LED. The constant current sink circuit is used for sinking pure DC current. The LEDs can be driven by pure constant current and can provide desired luminance.

7 Claims, 3 Drawing Sheets

20
D11
D31
D12
78
10
55
D32
77
IC
76
D21
D41
D22
D42
I $V_{peak}$
$I_{constant}$
0
time

LED DRIVER CIRCUIT FOR PROVIDING DESIRED LUMINANCE WITH CONSTANT CURRENT

BACKGROUND OF THE INVENTION

1. Field of the Invention

The present invention relates generally to an LED driver circuit, and more particularly to a constant current driver circuit that can drive LEDs and provide desired luminance.

2. Description of Prior Art

Conventional LED driver circuit drives the LED, and comprises an AC input and a full bridge rectifier. Please refer to FIG. 1A, which illustrates a schematic diagram of a prior art driver circuit. The full bridge rectifier includes diodes D11, D21, D31, and D41. The AC input to the circuit in FIG. 1 is indicated by the symbol for an AC source 10. The AC source 10 is used for generating an alternating voltage. The AC to DC rectification is performed by use of the full bridge rectifier. The diodes D31 and D21 conduct the positive half period current, and the diodes D41 and D11 conduct the negative half period current.

A current limit resistor 45 can be added to the full bridge rectifier. The current limit resistor 45 can limit the current flowing through the diodes D31 and D21 when conducting the positive half period current, and limit the current flowing through the diodes D41 and D11 when conducting the negative half period current. The diodes can be protected from over current damage by the current limit resistor 45.

However, the prior art driver circuit has one major drawback. FIG. 1B illustrates a current waveform that flows through the current limit resistor 45. The value of the current I is equal to the voltage divided by the resistance R of the current limit resistor 45. The peak value $I_{peak}$ is the maximum current that the LEDs can withstand. The resistance R of the current limit resistor 45 is selected on consideration of the maximum voltage $V_{peak}$. While the alternating voltage generated by the AC source 10 is subject to $V_{RMS}$, $V_{RMS}$ times the square root of 2 gives the peak value $V_{peak}$. However, $V_{RMS}$ varies slightly under the influence of household power consumption, and the diodes are often operated under insufficient current supplied conditions (less than maximum voltage $V_{peak}$ divided by the resistance R of the current limit resistor 45). Consequently, it is difficult to control the brightness of the driven LEDs accurately.

SUMMARY OF THE INVENTION

The present invention provides an LED driver circuit to resolve the foregoing problems faced by the conventional LED driver circuit. The present invention also has the advantage of providing a higher working duty during one period of the AC input.

An object of the present invention is to provide an LED driver circuit, which can sink pure DC current that will flow through LEDs. The LEDs can be driven by pure constant current and can provide desired luminance.

Another object of the present invention is to provide an LED driver circuit, wherein a supply voltage can be coupled to the LED driver circuit. The current flowing through the LEDs can be guaranteed to be a pure DC constant current.

A further object of the present invention is to provide an LED driver circuit, wherein the supply voltage can be configured to increase the working duty during one period of the AC input.

In accordance with an aspect of the present invention, an LED driver circuit provides desired luminance with consistent current. The LED driver circuit comprises a full bridge rectifier and a constant current sink circuit. The full bridge rectifier has at least a first bridge arm, a second bridge arm, a third bridge arm and a fourth bridge arm. The first bridge arm and the fourth bridge arm are connected in parallel with the third bridge arm and the second bridge arm in opposite directions respectively. Connection of the first bridge arm and the fourth bridge arm and connection of the second bridge arm and the third bridge arm is connected in series. Each of the bridge arms comprises at least one LED. The constant current sink circuit is coupled to the full bridge rectifier for sinking pure DC current.

In the preferred embodiment of the invention, the constant current sink is an IC (Integrated Circuit). The constant current sink is coupled to a supply voltage. The supply voltage is coupled to a connecting point of the third bridge arm and the fourth bridge arm. Voltage drop across the constant current sink is larger than driving voltage corresponding to the constant current sink.

The first bridge arm comprises the same number of LEDs as the number of LEDs constituting the second bridge arm. The third bridge arm comprises the same number of LEDs as the number of LEDs constituting the fourth bridge arm. A supply voltage is coupled to a connecting point between the two LEDs of the third bridge arm. Dropout voltage across the constant current sink is lower than the supply voltage.

In accordance with another aspect of the present invention, another LED driver circuit provides desired luminance with consistent current. The LED driver circuit comprises a full bridge rectifier and a constant current sink circuit. The full bridge rectifier has at least a first bridge arm, a second bridge arm, a third bridge arm and a fourth bridge arm. The first bridge arm and the fourth bridge arm are connected in parallel with the third bridge arm and the second bridge arm in opposite directions respectively. Connection of the first bridge arm and the fourth bridge arm and connection of the second bridge arm and the third bridge arm is connected in series. The third bridge arm and the fourth bridge arm comprise a plurality of LEDs. The constant current sink circuit is coupled to a supply voltage, a first connecting point of the third bridge arm and the fourth bridge arm and a second connecting point of the first bridge arm and the second bridge arm.

In the preferred embodiment of the invention, the constant current sink is an IC (Integrated Circuit). The supply voltage is coupled to a connecting point of the third bridge arm and the fourth bridge arm. Voltage drop between the first connecting point and the second connecting point is larger than the driving voltage corresponding to the constant current sink.

The first bridge arm comprises the same number of LEDs as the number of LEDs constituting the second bridge arm. the third bridge arm comprises the same number of LEDs as the number of LEDs constituting the fourth bridge arm. The supply voltage is coupled to a connecting point between the two LEDs of the third bridge arm. Dropout voltage across the constant current sink is lower than the supply voltage.

In accordance with a further aspect of the present invention, a further LED driver circuit provides desired luminance with consistent current. The LED driver circuit comprises a full bridge rectifier and a constant current sink circuit. The full bridge rectifier has at least a first bridge arm, a second bridge arm, a third bridge arm and a fourth bridge arm. The first bridge arm and the fourth bridge arm are connected in parallel with the third bridge arm and the second bridge arm in opposite directions respectively. Connection of the first bridge arm and the fourth bridge arm and connection of the second bridge arm and the third bridge arm is connected in series. The third bridge arm and the fourth bridge arm comprise a plurality of LEDs. The constant current sink circuit is coupled to a first connecting point of the third bridge arm and the fourth bridge arm, a second connecting point of the first bridge arm and the second bridge arm and a third connecting point between the LEDs of the third bridge arm.

In the preferred embodiment of the invention, the constant current sink is an IC (Integrated Circuit). The constant current sink is coupled to a supply voltage. Voltage at the third connecting point is higher than voltage at the first connecting point by one forward voltage drop of an LED. Dropout voltage between the first connecting point and the second connecting point is lower than the supply voltage.

The first bridge arm comprises the same number of LEDs as the number of LEDs constituting the second bridge arm. The third bridge arm comprises the same number of LEDs as the number of LEDs constituting the fourth bridge arm. Number of LEDs of the third bridge arm is two. Number of LEDs of the fourth bridge arm is two.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purpose of illustration and description only. It is not intended to be exhaustive or to be limited to the precise form disclosed.

According to the preferred embodiment of the present invention, an LED driver circuit provides desired luminance with consistent current. The LED driver circuit comprises a full bridge rectifier and a constant current sink circuit. The full bridge rectifier has at least a first bridge arm, a second bridge arm, a third bridge arm and a fourth bridge arm. The first bridge arm and the fourth bridge arm are connected in parallel with the third bridge arm and the second bridge arm in opposite directions respectively. Connection of the first bridge arm and the fourth bridge arm and connection of the second bridge arm and the third bridge arm is connected in series. Each of the bridge arms comprises at least one LED. The constant current sink circuit is coupled to the full bridge rectifier for sinking pure DC current.

The constant current sink is an IC (Integrated Circuit). The constant current sink is coupled to a supply voltage. The supply voltage is coupled to a connecting point of the third bridge arm and the fourth bridge arm. Voltage drop across the constant current sink is larger than driving voltage corresponding to the constant current sink. The first bridge arm comprises the same number of LEDs as the number of LEDs constituting the second bridge arm. The third bridge arm comprises the same number of LEDs as the number of LEDs constituting the fourth bridge arm. Number of the third bridge arm is two. Number of the fourth bridge arm is two. A supply voltage is coupled to a connecting point between the two LEDs of the third bridge arm. Dropout voltage across the constant current sink is lower than the supply voltage.

Figure 1A:
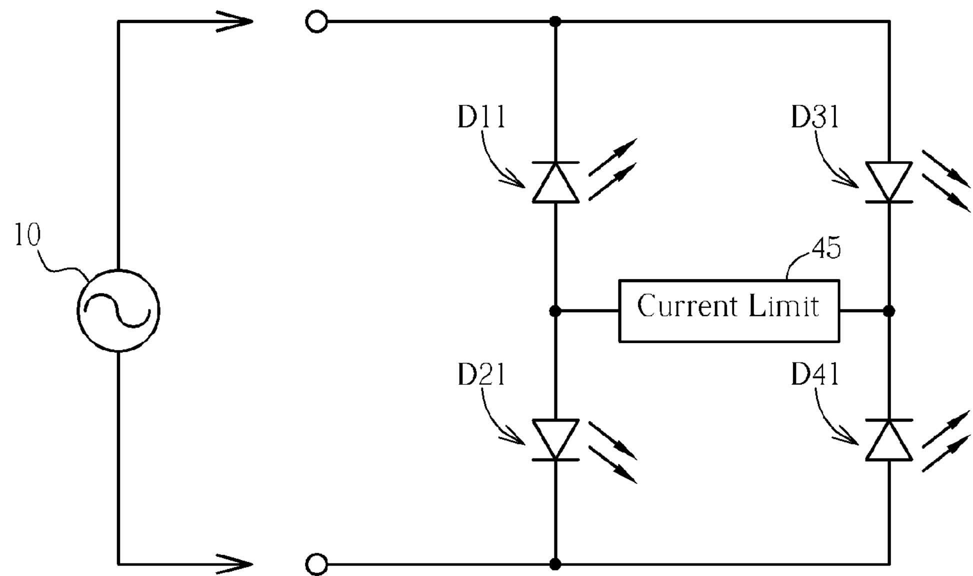
FIG. 1A illustrates a schematic diagram of a prior art driver circuit.
Figure 1B:
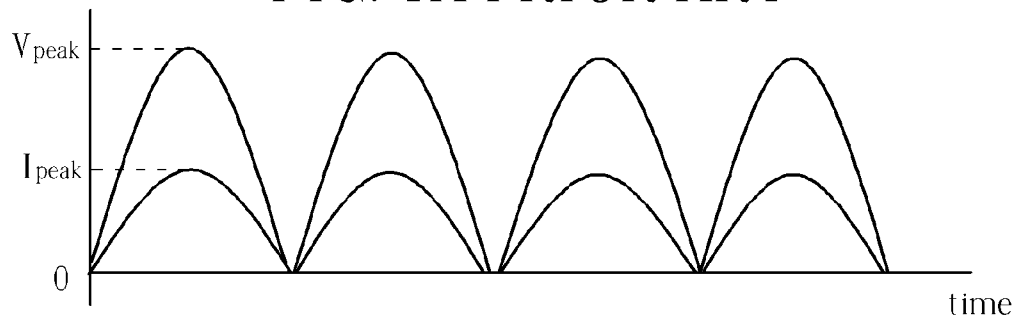
FIG. 1B illustrates a current waveform that flows through the current limit resistor in accordance with the prior driver illustrated in FIG. 1A.
Figure 2A:
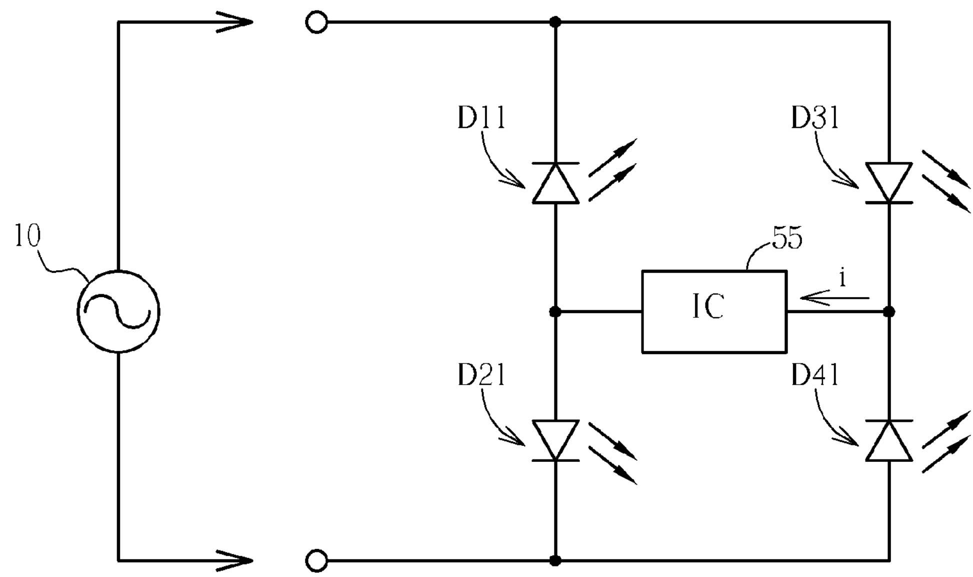
FIG. 2A illustrates a schematic diagram of a driver circuit in accordance with one embodiment of the present invention.

Referring to FIG. 2A, a schematic diagram of a driver circuit in accordance with one embodiment of the present invention is shown. According to the present invention, the LED driver circuit of the present invention includes at least a constant current sink circuit 55 and a full bridge rectifier. The full bridge rectifier includes at least a first bridge arm, a second bridge arm, a third bridge arm and a fourth bridge arm. Each of the bridge arms may consist of at least one LED. Sum of the number of LEDs of the first bridge arm and the number of LEDs of the fourth bridge arm is equal to sum of the number of LEDs of the second bridge arm and the number of LEDs of the third bridge arm. The first bridge arm includes an LED D11. The second bridge arm includes an LED D21. The third bridge arm includes an LED D31. The fourth bridge arm includes an LED D41.

The LED is capable of enduring a reverse voltage below the reverse breakdown voltage. The LED D11 and D41 connected in parallel with the LED D31 and D21 in opposite directions, respectively.

The constant current sink circuit 55 can sink pure DC current that will flow through LED D31 and LED D21 when conducting the positive half period current, and also sink pure DC current that will flow through LED D41 and LED D11 when conducting the negative half period current. The LEDs can be driven by pure constant current and can provide desired luminance.

Figure 2B:
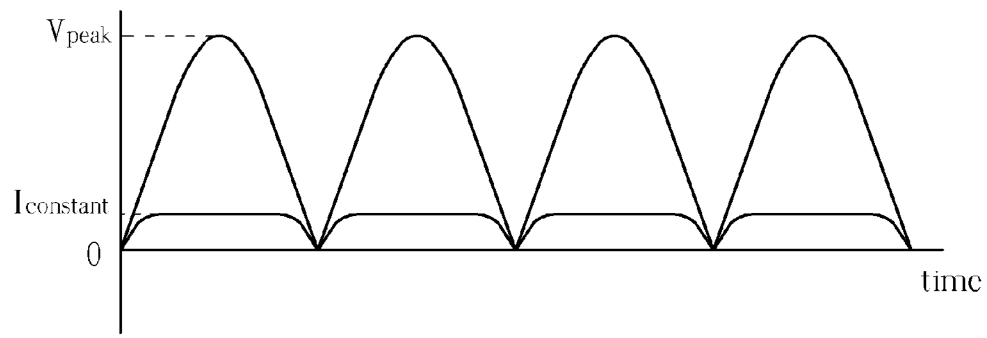
FIG. 2B illustrates a current waveform that flows through the constant current sink circuit in accordance with the embodiment illustrated in FIG. 2A.

Referring to FIG. 2B, a current waveform that flows through the constant current sink circuit 55 in accordance with one embodiment of the present invention is shown. The constant current sink circuit 55 is activated upon the generated alternating voltage reaches a startup voltage. Current flowing through the constant current sink circuit 55 is clamped at a constant value during one period of the AC input. Hence, the current flowing through the LEDs can be guaranteed to be a pure DC constant current.

According to the preferred embodiment of the present invention, there is another LED driver circuit provides desired luminance with consistent current. The LED driver circuit comprises a full bridge rectifier and a constant current sink circuit. The full bridge rectifier has at least a first bridge arm, a second bridge arm, a third bridge arm and a fourth bridge arm. The first bridge arm and the fourth bridge arm are connected in parallel with the third bridge arm and the second bridge arm in opposite directions respectively. The constant current sink circuit is coupled between a first connecting point of the third bridge arm and the fourth bridge arm and a second connecting point of the first bridge arm and the second bridge arm.

The constant current sink is an IC (Integrated Circuit). The supply voltage is coupled to a connecting point of the third bridge arm and the fourth bridge arm. Voltage drop between the first connecting point and the second connecting point is larger than the driving voltage corresponding to the constant current sink. The first bridge arm comprises the same number of LEDs as the number of LEDs constituting the second bridge arm. The third bridge arm comprises the same number of LEDs as the number of LEDs constituting the fourth bridge arm. Number of LEDs of the third bridge arm is two. Number of LEDs of the fourth bridge arm is two. The supply voltage is coupled to a connecting point between the two LEDs of the third bridge arm. Dropout voltage across the constant current sink is lower than the supply voltage.

Figure 3A:
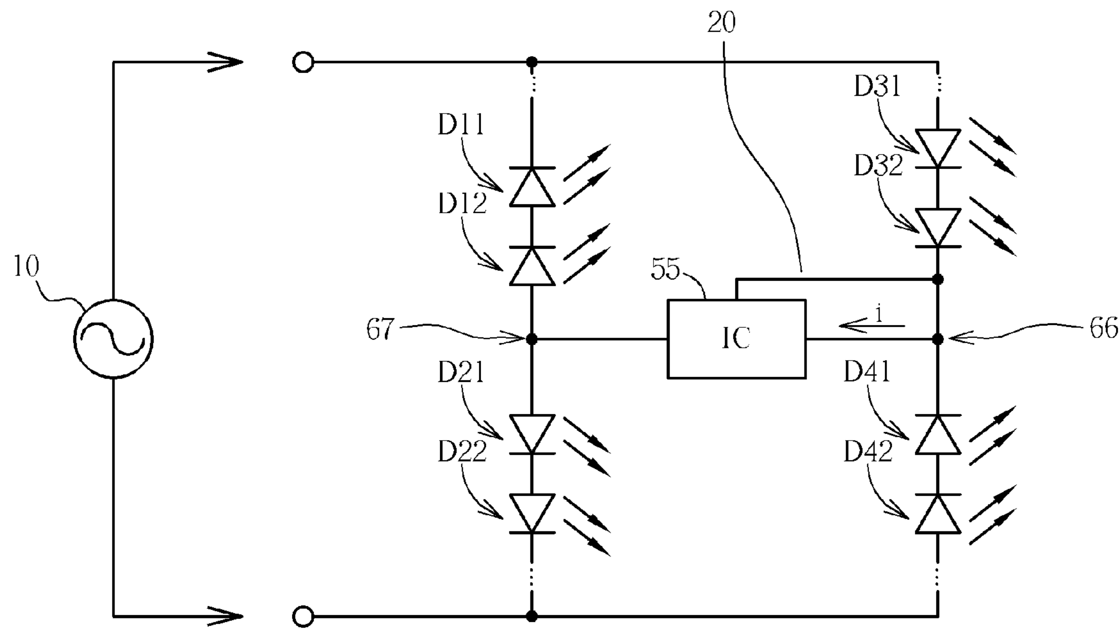
FIG. 3A illustrates a schematic diagram of a driver circuit in accordance with another embodiment of the present invention.

Referring to FIG. 3A, a schematic diagram of a driver circuit in accordance with another embodiment of the present invention is shown. According to another embodiment of the present invention, the constant current sink 55 may be an IC (Integrated Circuit). The LED driver circuit is coupled to a supply voltage 20 for driving the constant current sink circuit 55. The full bridge rectifier includes at least a first bridge arm, a second bridge arm, a third bridge arm and a fourth bridge arm.

The first bridge arm comprises the same number of LEDs as the number of LEDs constituting the second bridge arm. The third bridge arm comprises the same number of LEDs as the number of LEDs constituting the fourth bridge arm. Sum of the number of LEDs of the first bridge arm and the number of LEDs of the fourth bridge arm is equal to sum of the number of LEDs of the second bridge arm and the number of LEDs of the third bridge arm. Number of LEDs of the third bridge aim is two. Number of LEDs of the fourth bridge arm is two. As shown in this figure, the first bridge arm includes LED D11 and LED D12. The second bridge arm includes LED D21 and LED D22. The third bridge arm includes LED D31 and LED D32. The fourth bridge arm includes LED D41 and LED D42. The first bridge arm and the fourth bridge arm are connected in parallel with the third bridge arm and the second bridge arm in opposite directions respectively.

The LED is capable of enduring a reverse voltage below the reverse breakdown voltage. The LED D11, D12, D41 and D42 are connected in parallel with the LED D31, D32, D21 and D22 in opposite directions, respectively. The connection of the LED D11, D12 and D31, D32 and the connection of the D21, D22 and D41, D42 are connected in series.

The constant current sink circuit 55 can sink pure DC current that will flow through LED D31 and LED D21 when conducting the positive half period current, and also sink pure DC current that will flow through LED D41 and LED D11 when conducting the negative half period current. The supply voltage 20 is coupled to the connecting point of LEDs D32 and D41. As long as the voltage drop between node 66 and node 67 is larger than the driving voltage that the constant current sink 55 needs, the current flowing through the LEDs can be guaranteed to be a pure DC constant current.

Figure 3B:
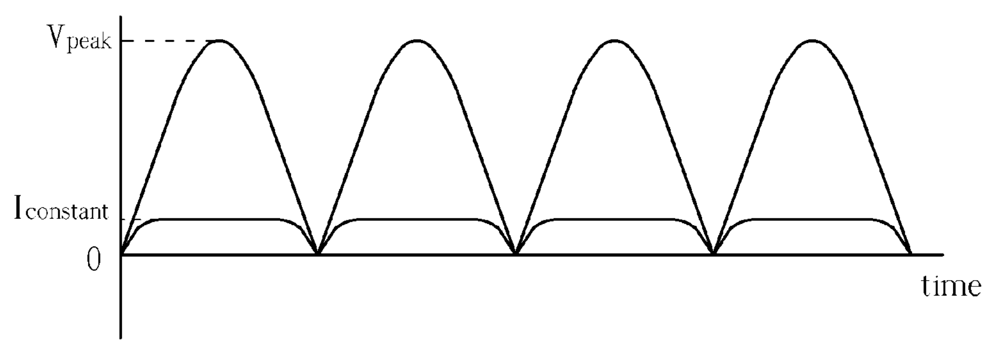
FIG. 3B illustrates a current waveform that flows through the constant current sink circuit in accordance with another embodiment illustrated in FIG. 3A.

Referring to FIG. 3B, a current waveform that flows through the constant current sink circuit 55 in accordance with another embodiment of the present invention is shown. The constant current sink circuit 55 is activated upon the generated alternating voltage reaches a startup voltage, for instance the supply voltage need by constant current sink 55 plus twice forward voltage drop $V_f$ of the LED. Current flowing through the constant current sink circuit 55 is clamped at a constant value during one period of the AC input. Hence, the current flowing through the LEDs can be guaranteed to be a pure DC constant current.

According to the preferred embodiment of the present invention, there is a further LED driver circuit provides desired luminance with consistent current. The LED driver circuit comprises a full bridge rectifier and a constant current sink circuit. The full bridge rectifier has at least a first bridge arm, a second bridge arm, a third bridge arm and a fourth bridge arm. The first bridge arm and the fourth bridge arm are connected in parallel with the third bridge arm and the second bridge arm in opposite directions respectively. Connection of the first bridge arm and the fourth bridge arm and connection of the second bridge arm and the third bridge arm is connected in series. The third bridge arm and the fourth bridge arm comprise a plurality of LEDs. The constant current sink circuit is coupled to a first connecting point of the third bridge arm and the fourth bridge arm, a second connecting point of the first bridge arm and the second bridge arm and a third connecting point between the LEDs of the third bridge arm.

The constant current sink is an IC (Integrated Circuit). The constant current sink is coupled to a supply voltage. Voltage at the third connecting point is higher than voltage at the first connecting point by one forward voltage drop of an LED. Dropout voltage between the first connecting point and the second connecting point is lower than the supply voltage. The first bridge arm comprises the same number of LEDs as the number of LEDs constituting the second bridge arm. The third bridge arm comprises the same number of LEDs as the number of LEDs constituting the fourth bridge arm. Number of LEDs of the third bridge arm is two. Number of LEDs of the fourth bridge arm is two.

Figure 4A:
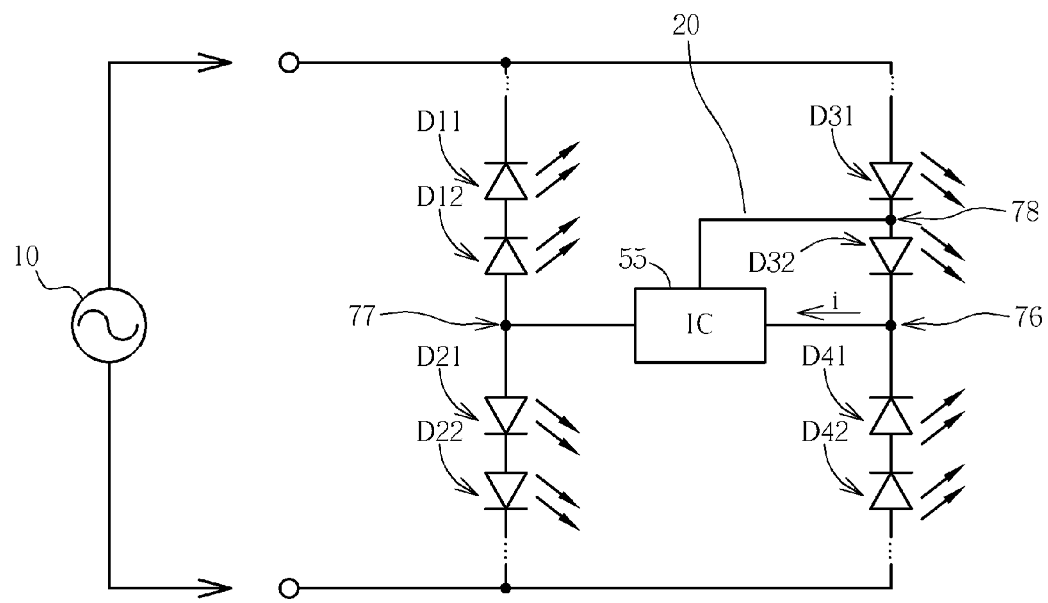
FIG. 4A illustrates a schematic diagram of a driver circuit in accordance with a further embodiment of the present invention.

Referring to FIG. 4A, a schematic diagram of a driver circuit in accordance with a further embodiment of the present invention is shown. According to another embodiment of the present invention, the LED driver circuit comprises a full bridge rectifier and a constant current sink circuit 55. The full bridge rectifier has at least a first bridge arm, a second bridge arm, a third bridge arm and a fourth bridge arm. The third bridge arm and the fourth bridge arm comprise a plurality of LEDs.

The first bridge arm comprises the same number of LEDs as the number of LEDs constituting the second bridge arm. The third bridge arm comprises the same number of LEDs as the number of LEDs constituting the fourth bridge arm. Sum of the number of LEDs of the first bridge arm and the number of LEDs of the fourth bridge arm is equal to sum of the number of LEDs of the second bridge arm and the number of LEDs of the third bridge arm. Number of LEDs of the third bridge arm is two. Number of LEDs of the fourth bridge arm is two. As shown in this figure, the first bridge arm includes LED D11 and LED D12. The second bridge arm includes LED D21 and LED D22. The third bridge arm includes LED D31 and LED D32. The fourth bridge arm includes LED D41 and LED D42. The first bridge arm and the fourth bridge arm are connected in parallel with the third bridge arm and the second bridge arm in opposite directions respectively.

The constant current sink circuit 55 is coupled to a first connecting point 76 of the third bridge arm and the fourth bridge arm, a second connecting point 77 of the first bridge arm and the second bridge arm, a third connecting point 78 between the LEDs of the third bridge arm and a fourth connecting point between the LEDs of the fourth bridge arm.

The constant current sink 55 is an IC (Integrated Circuit). The constant current sink 55 is coupled to a supply voltage. Voltage at the third connecting point 78 is higher than voltage at the first connecting point 76 by one forward voltage drop of an LED. Dropout voltage between the first connecting point 76 and the second connecting point 77 is much lower than the supply voltage need by constant current sink 55. The working duty during one period of the driving system could be higher.

Figure 4B:
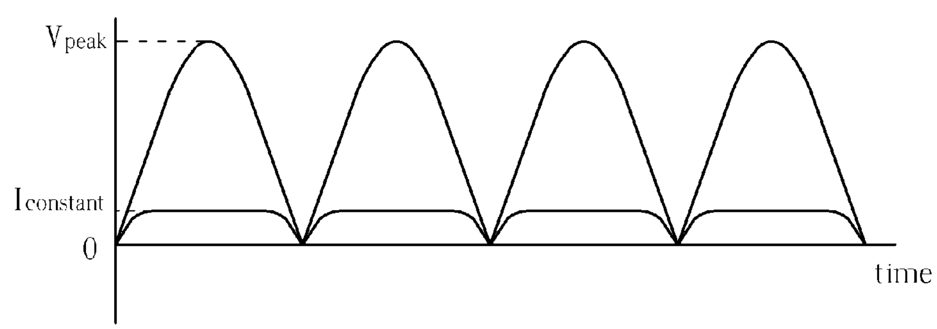
FIG. 4B illustrates a current waveform that flows through the constant current sink circuit in accordance with further embodiment illustrated in FIG. 4A.

Referring to FIG. 4B, a current waveform that flows through the constant current sink circuit 55 in accordance with further embodiment of the present invention is shown. The constant current sink circuit 55 is activated upon the generated alternating voltage reaches a startup voltage, for instance dropout voltage between the first connecting point 76 and the second connecting point 77 plus twice forward voltage drop $V_f$ of the LED. The required dropout voltage in FIG. 4A is usually smaller than the supply voltage in FIG. 3A; thus, the working duty during one period of the AC input is increased. Current flowing through the constant current sink circuit 55 is clamped at a constant value during one period of the AC input. Hence, the current flowing through the LEDs can be guaranteed to be a pure DC constant current.

The present invention sinks DC current that will flow through LEDs. The LEDs can be driven by constant current and can provide desired luminance. The present invention also increases the working duty during one period of the LED driver circuit. Hence, the shortcoming can be entirely avoided.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An LED driver circuit for providing desired luminance with constant current, said LED driver circuit comprising:

a full bridge rectifier having at least a first bridge arm, a second bridge arm, a third bridge arm and a fourth bridge arm, said first bridge arm and said fourth bridge arm being connected in parallel with said third bridge arm and said second bridge arm in opposite directions respectively, connection of said first bridge arm and said fourth bridge arm and connection of said second bridge arm and said third bridge arm being connected in series, said third bridge arm and said fourth bridge arm comprising a plurality of LEDs; and a constant current sink circuit coupled to a first connecting point of said third bridge arm and said fourth bridge arm, a second connecting point of said first bridge arm and said second bridge arm and a third connecting point between said LEDs of said third bridge arm.

2. The LED driver circuit according to claim 1, wherein said constant current sink is an IC (Integrated Circuit), said constant current sink is coupled to a supply voltage.

3. The LED driver circuit according to claim 1, wherein voltage at said third connecting point is higher than voltage at said first connecting point by one forward voltage drop of an LED.

4. The LED driver circuit according to claim 1, wherein dropout voltage between said first connecting point and said second connecting point is lower than said supply voltage.

5. The LED driver circuit according to claim 1, wherein said first bridge arm comprises the same number of LEDs as the number of LEDs constituting said second bridge arm.

6. The LED driver circuit according to claim 1, wherein said third bridge arm comprises the same number of LEDs as the number of LEDs constituting said fourth bridge arm.

7. The LED driver circuit according to claim 1, wherein number of LEDs of said third bridge arm is two, number of LEDs of said fourth bridge arm is two.

* * * * *